United States Patent
Wung et al.

[11] Patent Number: 6,113,047
[45] Date of Patent: Sep. 5, 2000

[54] DUAL POINT VEHICLE MOUNT FOR COMPUTER TERMINAL

[75] Inventors: Peter Wung, Redmond; Bahram Sharifi, West Mukilteo, both of Wash.

[73] Assignee: Intermec Technologies Corporation, Everett, Wash.

[21] Appl. No.: 08/990,712

[22] Filed: Dec. 15, 1997

[51] Int. Cl.[7] .................................................. E04G 3/00
[52] U.S. Cl. ..................... 248/284.1; 224/929; 248/917; 248/923
[58] Field of Search ............................. 248/284.1, 291.1, 248/299.1, 635, 659, 923, 324, 917, 922; 224/483, 282, 929

[56] References Cited

U.S. PATENT DOCUMENTS

| | | | |
|---|---|---|---|
| 257,050 | 4/1882 | Munson | 248/291.1 X |
| 1,282,489 | 10/1918 | Strodel | 248/291.1 X |
| 1,647,803 | 11/1927 | Hodny et al. | 248/291.1 X |
| 1,706,606 | 3/1929 | Harkness | 248/300 |
| 3,189,185 | 6/1965 | Grasso | 248/300 X |
| 4,306,708 | 12/1981 | Gassaway et al. | 248/635 X |
| 4,337,918 | 7/1982 | Gregory . | |
| 4,478,382 | 10/1984 | Carrier | 248/923 X |
| 4,832,299 | 5/1989 | Gorton et al. | 248/291.1 X |
| 4,854,538 | 8/1989 | Von Schalscha . | |
| 4,946,120 | 8/1990 | Hatcher | 224/929 X |
| 4,950,010 | 8/1990 | Denny . | |
| 4,964,606 | 10/1990 | Beam et al. | 248/923 X |
| 5,054,011 | 10/1991 | Alves . | |
| 5,064,162 | 11/1991 | Jondelius . | |
| 5,139,223 | 8/1992 | Sedighzadeh | 248/324 |
| 5,195,900 | 3/1993 | Kumagai et al. . | |
| 5,240,215 | 8/1993 | Moore . | |
| 5,555,491 | 9/1996 | Tao . | |
| 5,632,462 | 5/1997 | Kallas . | |
| 5,675,248 | 10/1997 | Kurita et al. . | |
| 5,726,395 | 3/1998 | Anagnos | 248/635 X |
| 5,797,568 | 8/1998 | Canton Gongora et al. | 248/291.1 X |
| 5,829,730 | 11/1998 | Ott | 248/635 |

*Primary Examiner*—Ramon O. Ramirez
*Attorney, Agent, or Firm*—Joan H. Pauly

[57] ABSTRACT

A vibration resistant mounting bracket has a base attachable to a support structure by bolts. Isolator bushings are positioned in the mounting holes in the bracket to isolate the bracket from shocks and vibration. A pair of arms project perpendicularly from the base. Each arm has a round opening and an arcuate opening concentric with the round opening. A first fastener pivotably connects a terminal to each arm of the bracket at a pivot axis defined by the round openings. A second fastener has a shaft extending through the arcuate opening and into a second threaded opening in the terminal. The second fastener may be tightened and loosened to secure the terminal in a pivot position relative to the bracket and release the terminal from the pivot position to change to a different pivot position.

8 Claims, 8 Drawing Sheets

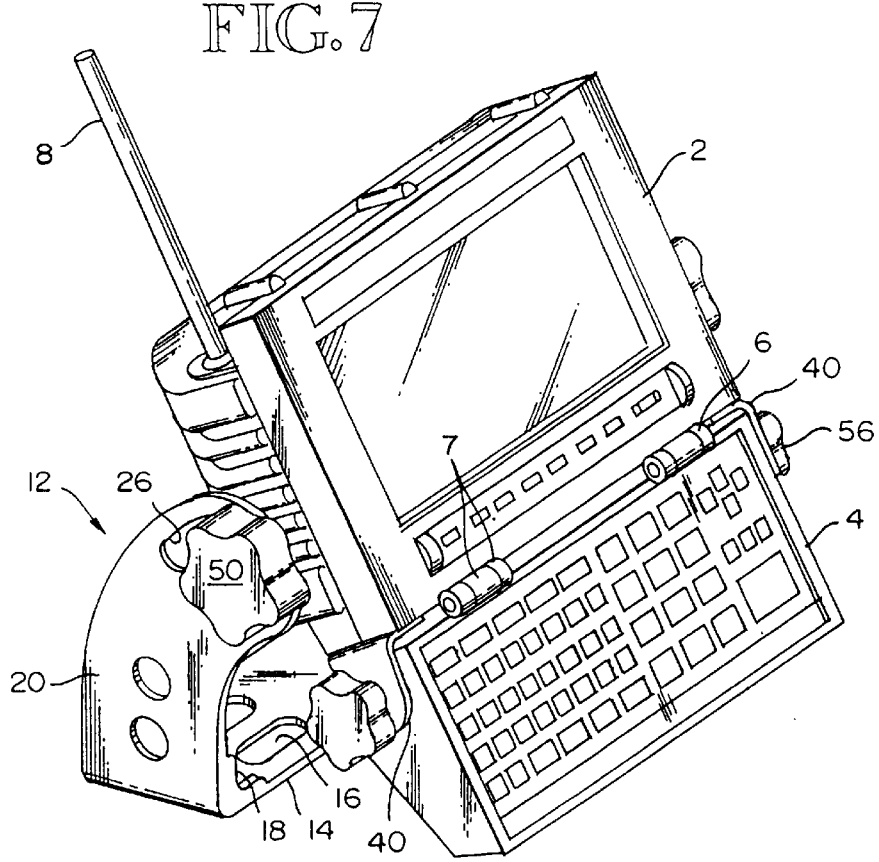
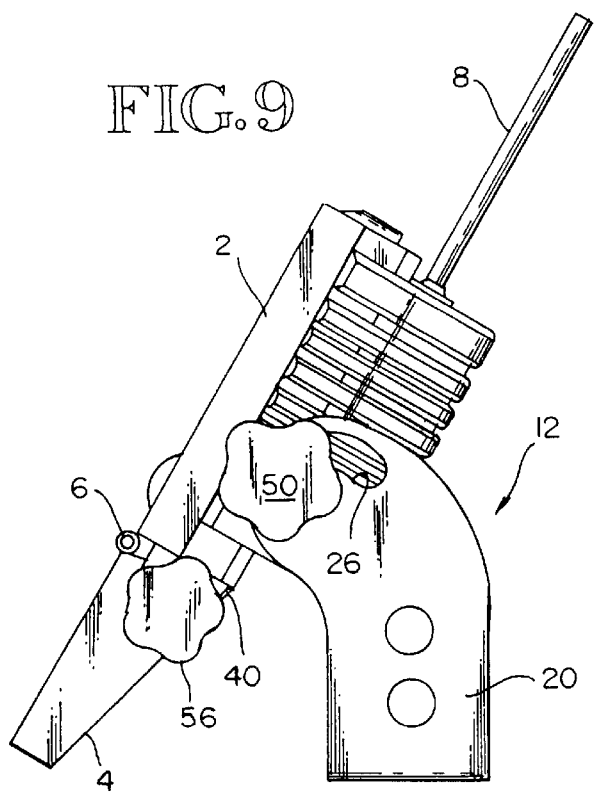
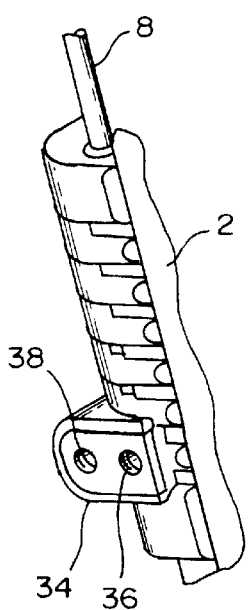

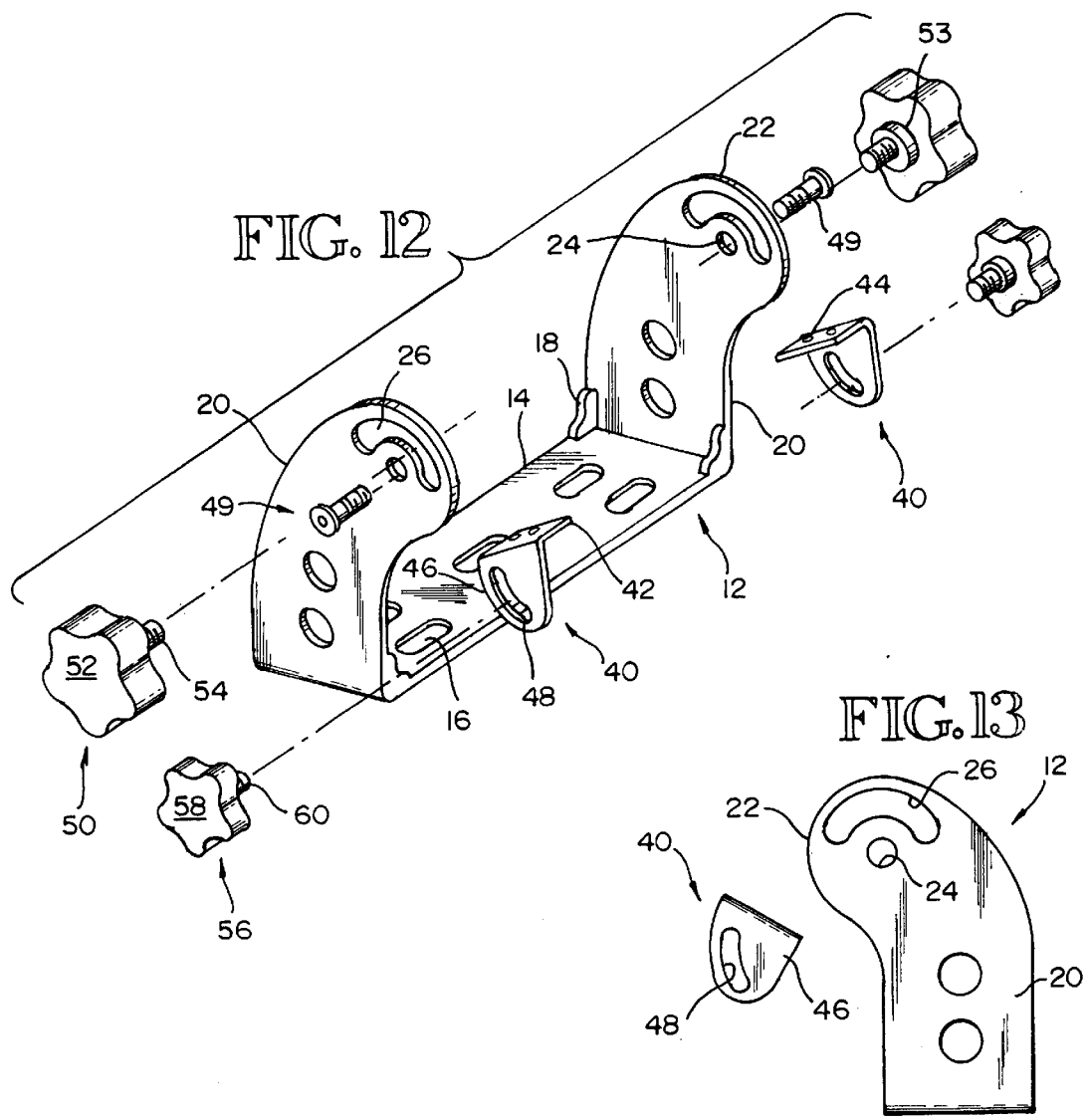
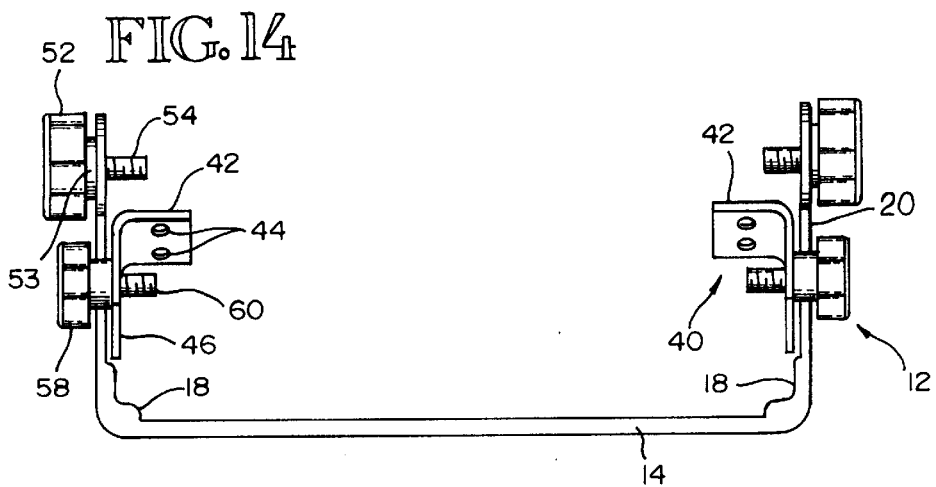

DUAL POINT VEHICLE MOUNT FOR COMPUTER TERMINAL

TECHNICAL FIELD

This invention relates to mounting brackets and, more particularly, to a vibration resistant mounting bracket that pivotably attaches to a component along a pivot axis and has an arcuate opening with the pivot axis as its center. A fastener engages the component and is slidable along the arcuate opening. The fastener is releasably tightenable to secure the fastener in a desired position along the arcuate opening and to allow loosening of the fastener to adjust the position of the component.

BACKGROUND INFORMATION

In warehouse and similar environments, pallets, packages and other items are commonly moved around by forklift operators. Identifying the items being moved is highly desirable to accurately track the locations of the items and the number of items on hand. The usual method of keeping track is to identify the items by means of bar codes. The bar code of an item is scanned using a bar code reader, which sends the bar code information to a computer terminal. The reader may be cable-connected to the terminal or may have a cableless connection, such as a radio frequency connection. Information received by the terminal is frequently further communicated from the terminal to a host computer by radio frequency. This arrangement allows efficient and real time accumulation of inventory information at a centralized location.

The forklifts currently in common use do not have specific provisions for the inclusion of computer terminals and generally have very limited space. The lack of built-in computer mounts, the limitations on space, and the variations in the designs of different forklifts create a need for a mounting bracket for computer terminals that will attach to various structural members of forklifts and allow the terminals to be mounted in a variety of orientations. A known type of mounting bracket for computer terminals has a base that may be secured to a support structure and projecting arms that attach to the terminal by means of a pair of screws, one screw on each side of the terminal. The two screws support the entire weight of the terminal and also function as the axis of rotation about which the position of the terminal is adjusted to orient the terminal in a position accessible to the operator. When the terminal has been placed in the desired position, the fasteners are tightened to hold the terminal in that position. To provide friction to hold the terminal in position, the fasteners are extended through rubber washers positioned between the bracket and the terminal.

There are a number of drawbacks associated with the known bracket arrangement described above. First, the entire weight of the terminal is supported by two screws that must bear all the loads imposed by the shocks and vibrations that are a natural consequence of the use of a forklift. These forces can lead to shearing or other failure of the screws. Another problem is that the rubber washers are not sufficient to maintain the terminal in a desired tilted position. The terminal has a natural tendency to pivot about its pivot axis back to an upright position. This natural tendency is reinforced by the operational shocks and vibrations. Thus, conventional brackets have reliability problems both in terms of failure of the mounting connection and failure to maintain the terminal in the correct position.

DISCLOSURE OF THE INVENTION

An aspect of the invention relates to a vibration resistant mounting bracket for mounting a component and providing an adjustable orientation of the component relative to the bracket. The bracket comprises a base attachable to a support structure and a pair of arms projecting from opposite end portions of the base. The arms are spaced apart a distance sufficient to receive the component therebetween. For each arm, a first fastener is aligned along a pivot axis and positioned to engage the component to pivotably connect the component to the bracket. Each arm has an arcuate opening defining a circular arc with the pivot axis as its center. For each arm, a second fastener has a shaft portion that extends through the arcuate opening and engages the component. The second fastener is releasably tightenable to secure the shaft portion in a desired position along the arc and the component in a desired orientation relative to the bracket. The releasable tightenability also allows loosening of the second fastener and adjustment of the orientation to improve readability of the component to a user of the component.

The first and second fasteners may take various forms. Preferably, the first fastener comprises a shoulder screw that threadedly engages the component and pivotably engages the corresponding arm of the bracket. Also preferably, the second fastener comprises a bolt having a head portion that is tightenable against the corresponding arm of the bracket to secure the component against movement relative to the bracket.

The details of the structure of the arms may also be varied. Preferably, the arms are substantially flat and substantially parallel and extend substantially perpendicularly from the base. The outer end portions of the arms curve to be offset from the base to facilitate connection of each of the arms to either of the two opposite sides of the component and adjustment of the orientation of the component relative to the bracket over a wide range of orientations. Currently, an arc length of about 1250 for the arcuate opening is considered optimal. This extent permits the desired range of adjustment while avoiding weakening of the structure of the arm that may result from greater arcuate extents.

In the currently preferred embodiment, the base of the bracket comprises a substantially flat plate from which the arms extend substantially perpendicularly. The bracket includes a plurality of gussets positioned at junctures between the plate and the arms. The gussets reinforce the bracket structure to help prevent failure of the bracket when it is subjected to severe vibrations and lateral dynamic loads.

The base plate has at least one mounting hole extending therethrough. Preferably, an isolator bushing is positioned in the hole and has opposite flanges for engaging a support structure and a head portion of a bolt fastener extended through the bushing to attach the base to the support structure. The bushing is sufficiently compressible to isolate the component from vibrations and lateral dynamic loads. As used herein, the term "isolate" is intended to mean that the vibrations and loads to which the bracket is subjected are lessened sufficiently to minimize the probability of failure of the bracket and prevent damage to the component. It is not intended to imply complete isolation of the component from all vibrations and loads. In preferred form, the bushing has a main body portion and a metal sleeve. The main body portion is made of an elastomeric material and defines an axial opening for receiving a shaft portion of a fastener therethrough. The metal sleeve lines an axially center portion of the axial opening. The use of the metal sleeve reinforces the bushing to increase its wear resistance and helps stabilize the structure of the bushing.

According to another aspect of the invention, a mounting bracket for mounting a computer terminal on a vehicle is provided. In its basic form, the bracket comprises a base attachable to a support structure of the vehicle and a pair of arms projecting from opposite end portions of the base. The arms are spaced apart a distance sufficient to receive a computer terminal therebetween. Each arm has a round opening configured to receive a first fastener for removably engaging the terminal to removably and pivotably connect the terminal to the bracket. The openings in the arms are aligned and together define a pivot axis. Each arm also has an arcuate opening defining a circular arc concentric with the round opening. The arcuate openings are aligned and each arcuate opening is configured to receive a shaft of a second fastener that engages the terminal. The second fastener is tightenable to secure the shaft in a desired position along the arc to secure the terminal in a desired orientation relative to the bracket. The second fastener can be loosened to allow adjustment of the orientation and readability of the terminal to an operator of the vehicle.

In many situations, it is desirable to mount a terminal that has a display portion and a keyboard portion removably and pivotably attached to the display portion. This permits the adjustment of the position of the keyboard portion relative to the display portion to improve the ergonomics of the mount. It also allows the keyboard portion to be separated from the display portion and separately mounted at another location on the vehicle. A feature of the invention designed for terminals having a display portion with a keyboard portion hingedly attached thereto is a second pair of arms for securing the keyboard portion in a pivot position relative to the display portion. The arms of the second pair are fixedly secured to one of the portions of the terminal. Each arm of the second pair has an arcuate opening configured to receive a releasably tightenable fastener for releasably securing the keyboard portion against pivoting relative to the display portion about a hinge axis.

The invention also encompasses a method of mounting a computer terminal on a vehicle. According to an aspect of the invention, the method comprises providing a mounting bracket having opposite arms, with each arm having an arcuate opening extending therethrough defining an arc with a center axis spaced from the opening. The bracket is secured to a support structure, and the terminal is positioned between the arms. The terminal is pivotably connected to each arm of the bracket at the center axis. A fastener is extended through each arcuate opening and into engagement with the terminal to fixedly engage the terminal and slidably engage the bracket. The terminal is pivoted about the center axis into a desired position relative to the bracket. The pivoting of the terminal includes allowing the fasteners to slide along the arcs of the arcuate openings. After pivoting the terminal into the desired position, the fasteners are tightened to prevent further pivoting of the terminal relative to the bracket.

In a number of situations, during operation of the vehicle, the operator may desire to change the orientation of the terminal due to changes in working conditions or due to a new operator beginning work on the vehicle. In such situations, the method may further comprise loosening the fasteners, pivoting the terminal into a second desired position relative to the bracket to improve readability of the terminal to the operator, and then retightening the fasteners to prevent pivoting of the terminal out of the second desired position.

According to another aspect of the invention, the method of mounting a computer terminal on a vehicle comprises providing a mounting lug on each of opposite sides of the terminal and providing a mounting bracket. Each mounting lug has first and second threaded openings. The mounting bracket has opposite arms. Each arm has a pair of openings extending therethrough, including a round opening and an arcuate opening defining an arc concentric with the round opening. The bracket is secured to a support structure of the vehicle. The terminal is positioned between the arms, and the openings in the lugs are aligned with the openings in the arms. At each arm, a first fastener is extended through the round opening and into the first opening to threadedly engage the first opening and pivotably engage the bracket to pivotably connect the terminal to the bracket. A second fastener is extended through the arcuate opening and into the second opening to threadedly engage the second opening and slidably engage the bracket. The terminal is pivoted into a desired position relative to the bracket, and, then, the second fasteners are tightened to prevent further pivoting of the terminal relative to the bracket.

The bracket and method of the invention provide a significant improvement over the conventional arrangement described above. The invention, and particularly its four-point support feature, provide increased resistance to shock and vibration to help increase the reliability of the bracket and minimize the chances for damage to the component being mounted. On each side of the mount, the arcuate opening shares some of the dynamic and static loading with the pivot hole, producing uniform load distribution and avoiding stress concentration on one hole. Therefore, failure is minimized. These goals are attained without sacrificing the mounting flexibility of the mounting arrangement in terms of the structures on which the component may be mounted and the relative orientation of the component. This flexibility helps maximize the ergonomics of the component. The invention provides increased reliability and maximized ergonomics in a cost effective manner. The structure of the bracket of the invention is relatively simple and inexpensive to manufacture. In addition, the amount of space required by the bracket is minimal to allow mounting of the component in a maximum number of locations without creating an obstruction that could hinder the work of the operator.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 7 is like FIG. 1 except that it shows the keyboard portion in a different position in which it is not tilted relative to the display portion.

FIG. 8 is a fragmentary pictorial view of a portion of the terminal shown in FIGS. 1–7, illustrating the mounting lug on the side of the terminal.

FIG. 9 is a side elevational view of the bracket and terminal shown in FIG. 7.

FIG. 12 is an exploded pictorial view of the preferred embodiment of the bracket.

FIG. 13 is a side elevational view of the main bracket and one of the keyboard brackets shown in FIG. 12.

FIG. 14 is a front elevational view of the elements shown in FIG. 12 in their assembled positions.

BEST MODE FOR CARRYING OUT THE INVENTION

Figure 16:
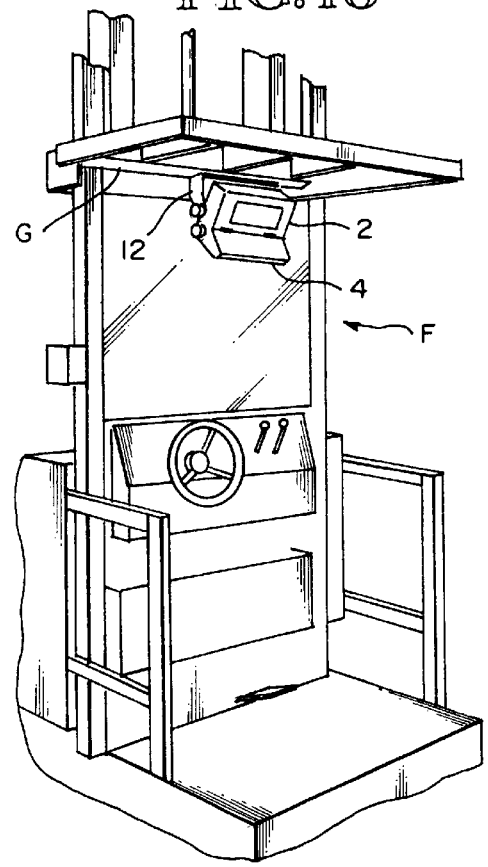
FIG. 16 is a pictorial view illustrating the mounting of a terminal in an overhead position in a forklift cab.
Figure 17:
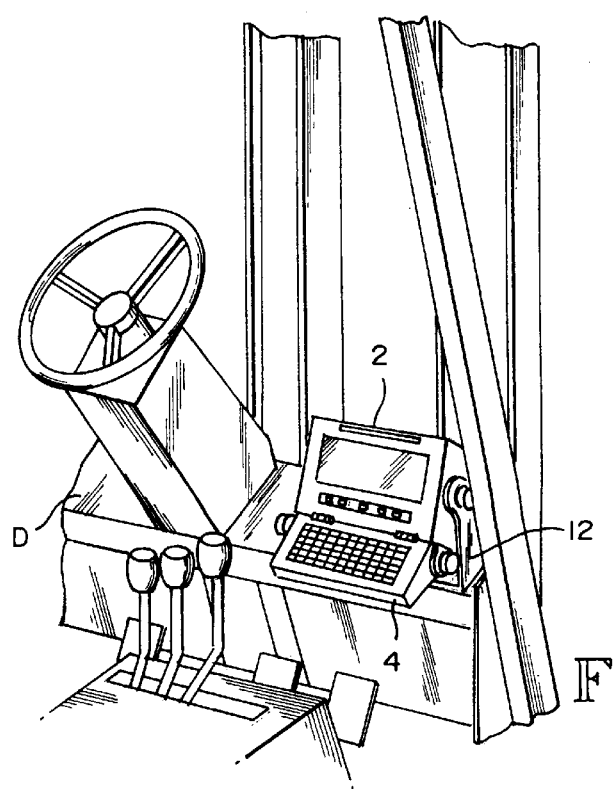
FIG. 17 is a pictorial view illustrating a dash mount of a terminal.

The drawings show apparatus that is constructed in accordance with the invention and that constitutes the best mode for carrying out the invention currently known to the applicants. In FIGS. 1–7, 9–11, 16, and 17, the bracket of the invention is shown mounting a computer terminal having a display portion 2 and a keyboard portion 4 hingedly connected to the display portion 2. It is anticipated that the primary use of the bracket of the invention will be to mount computer terminals of the type shown in the drawings. However, it is intended to be understood that the bracket may also be used advantageously to mount other types of terminals and other kinds of components. The invention is especially advantageous for mounting various types of components that are vulnerable to damage from shocks and vibrations. For example, in use, a forklift is subjected to various shocks and vibrations that tend to be transmitted to components mounted in or on the forklift. It is anticipated that the bracket of the invention will primarily be used for mounting computer terminals in forklifts, as illustrated in FIGS. 16 and 17. The bracket of the invention is particularly well-suited to this environment and to other vehicle environments and nonvehicle environments where shocks and vibrations are likely to be encountered.

Referring to FIGS. 1–11, the terminal 2, 4 shown therein is designed for use in a warehouse or similar environment for receiving bar code information from a scanner. The terminal 2, 4 processes the information and then transmits it to a host computer. The transmission is most commonly a radio frequency transmission for which an antenna 8 is provided. As noted above, the terminal includes a display portion 2 to which a keyboard portion 4 is pivotably attached by a hinge 6. The preferred embodiment of the invention relates to the hinged attachment of the keyboard portion 4 as well as to the mount of the terminal 2, 4 as a unit to a support structure.

The structure of the preferred embodiment of the bracket 12 can be seen in FIGS. 1–14 and is best seen in FIGS. 12–14. The bracket 12 is made from heavy gauge metal and includes a flat plate-like base 14 that is attachable to a support structure of a vehicle, such as a forklift. For attachment purposes, the base 14 is provided with six fastener slots 16 arranged in three pairs. The slot configuration of the fastener openings 16 increases the versatility of the bracket 12 by allowing the adjustment of fastener locations as required by the dimensions of the support structure.

The bracket 12 also includes a pair of arms 20 projecting from opposite end portions of the base 14. As shown, in the preferred embodiment, the arms 20 are substantially flat and substantially parallel and extend substantially perpendicularly from the base 14. Four gussets 18 are positioned at the junctures between the base plate 14 and the arms 20, one gusset 18 at each corner of the base plate 14. These gussets 18 serve to reinforce the structure of the bracket 12 and prevent failure of the bracket 12 at the junctures.

Figure 1:
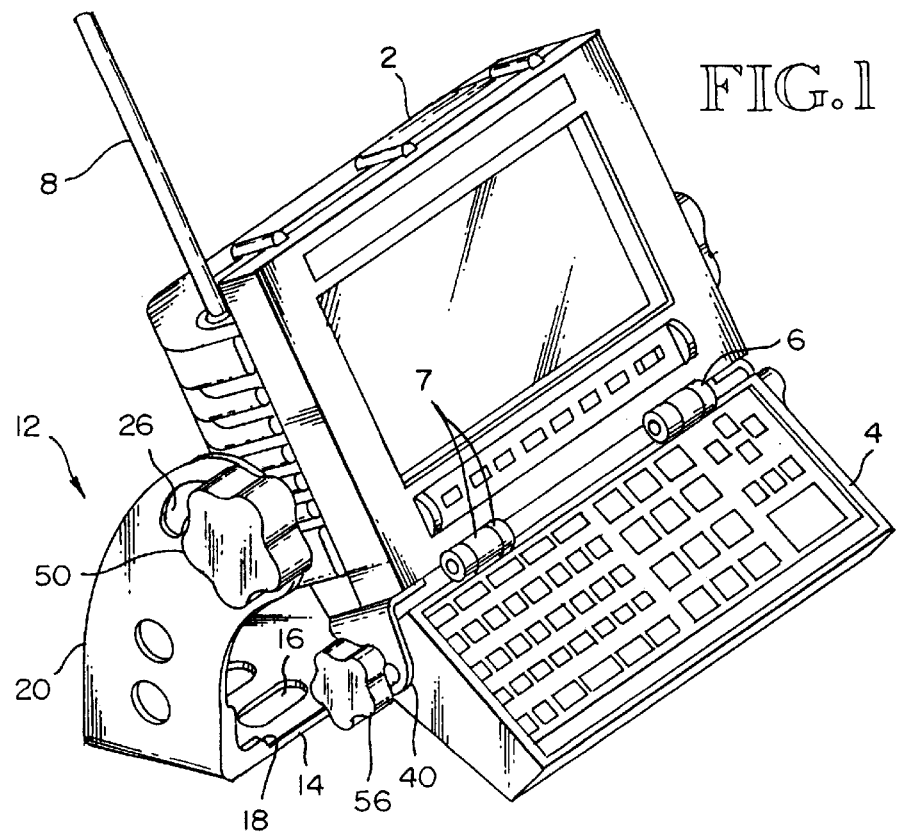
FIG. 1 is a pictorial view of the preferred embodiment of the bracket shown mounting a computer terminal with a keyboard portion hingedly attached to a display portion.
Figure 2:
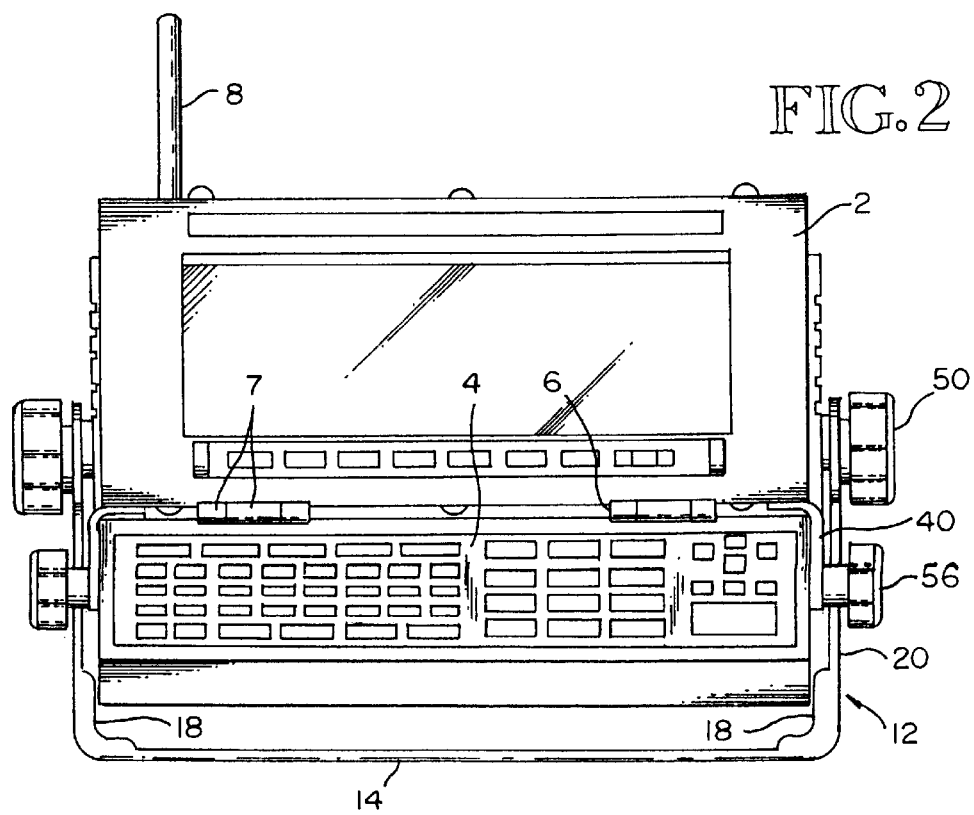
FIG. 2 is a front elevational view of the bracket and terminal shown in FIG. 1.
Figure 3:
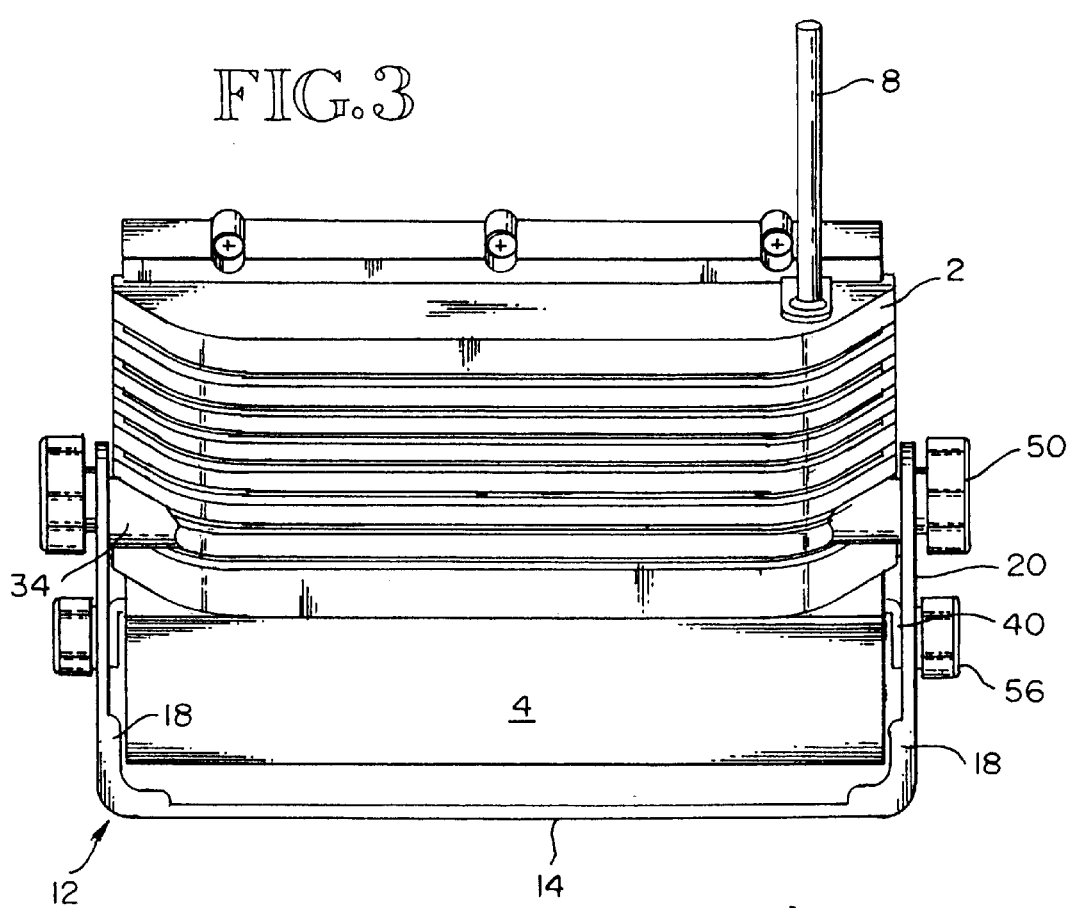
FIG. 3 is a rear elevational view of the bracket and terminal shown in FIGS. 1 and 2.
Figure 4:
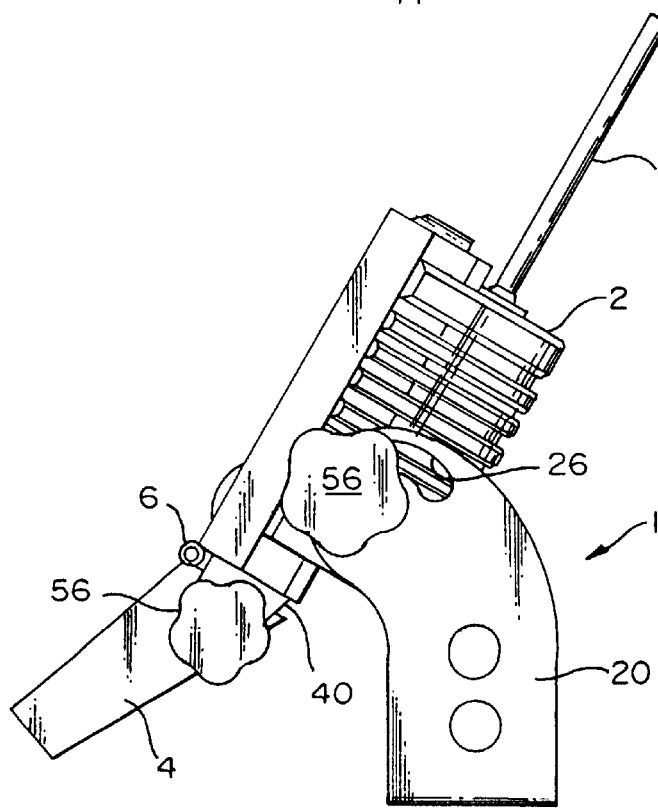
FIG. 4 is a side elevational view of the bracket and terminal s in FIGS. 1–3.
Figure 5:
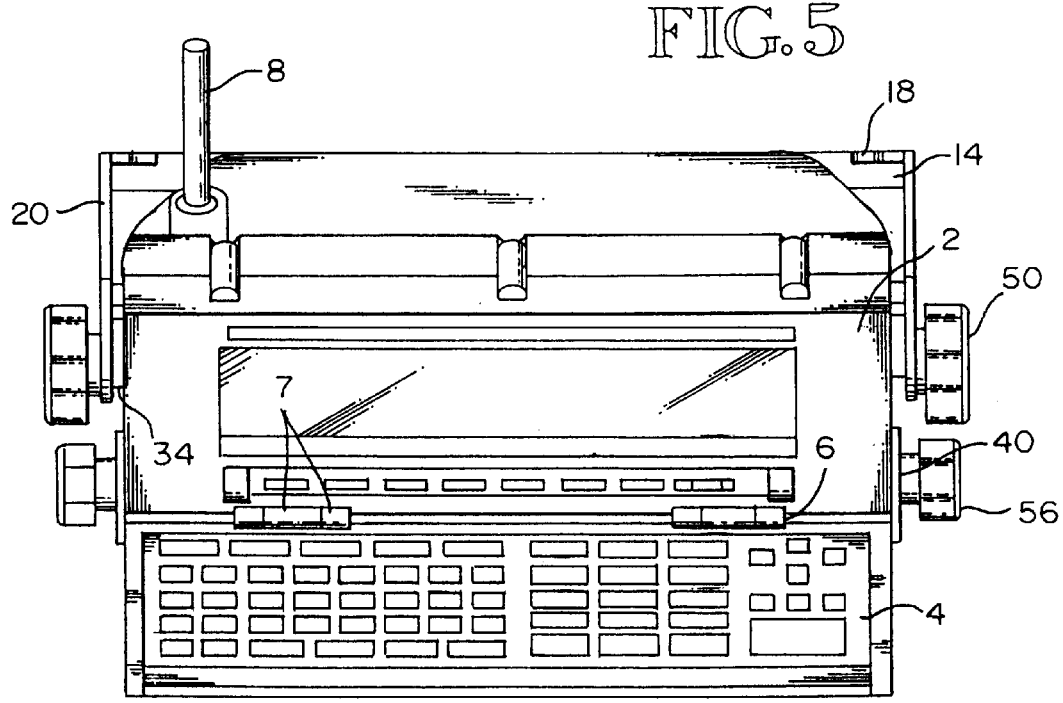
FIG. 5 is a top plan view of the bracket and terminal shown in FIGS. 1–4.
Figure 6:
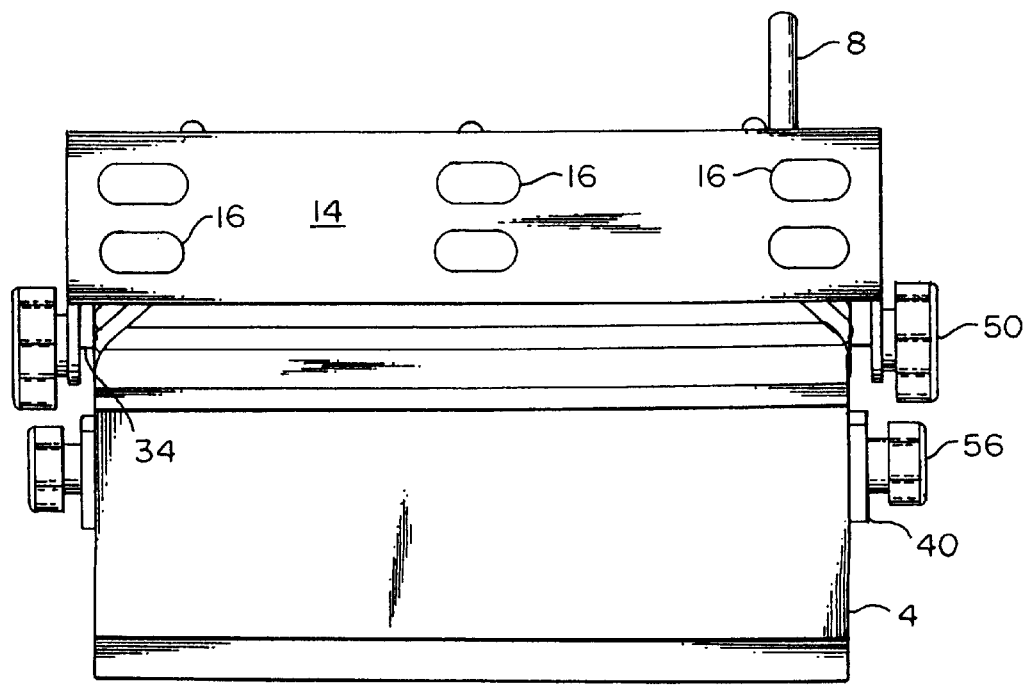
FIG. 6 is a bottom plan view of the bracket and terminal shown in FIGS. 1–5.
Figure 10:
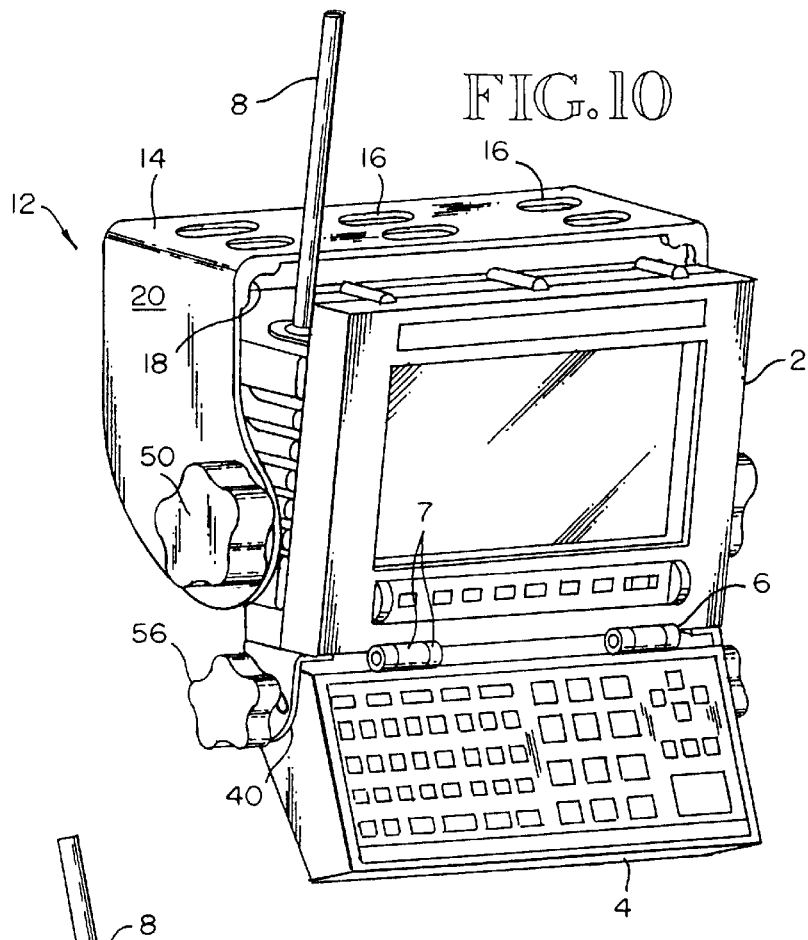
FIG. 10 is like FIG. 1 except that it shows the bracket in an orientation for an overhead mount of the terminal.

The parallel planes of the arms 20 are perpendicular to the plane of the base 14. The outer end portion 22 of each arm 20 curves in the plane of the arm 20 to be offset from the base 14, as shown in FIG. 12. This configuration facilitates connection of each of the arms 20 to either of the two opposite sides of a terminal. It also facilitates adjustment of the orientation of the terminal relative to the bracket 12 over a wide range of orientations. This is illustrated in FIGS. 1 and 10, which show the arms of the bracket 20 in opposite orientations relative to the terminal 2, 4. The two opposite orientations accommodate mounting on a substantially horizontal surface in the orientation shown in FIG. 1 and mounting on an overhead surface in the configuration shown in FIG. 10.

Each arm 20 has, at its curved outer end 22, a round opening 24 and an arcuate opening 26 extending therethrough. The pairs of openings 24, 26 in the two arms 20 are aligned. The round openings 24 are aligned on a pivot axis and together define the axis. Each arcuate opening 26 defines a circular arc concentric with the round opening 24, i.e. having the pivot axis as its center. The preferred extent of the arcuate opening is about 125°.

Figure 18:
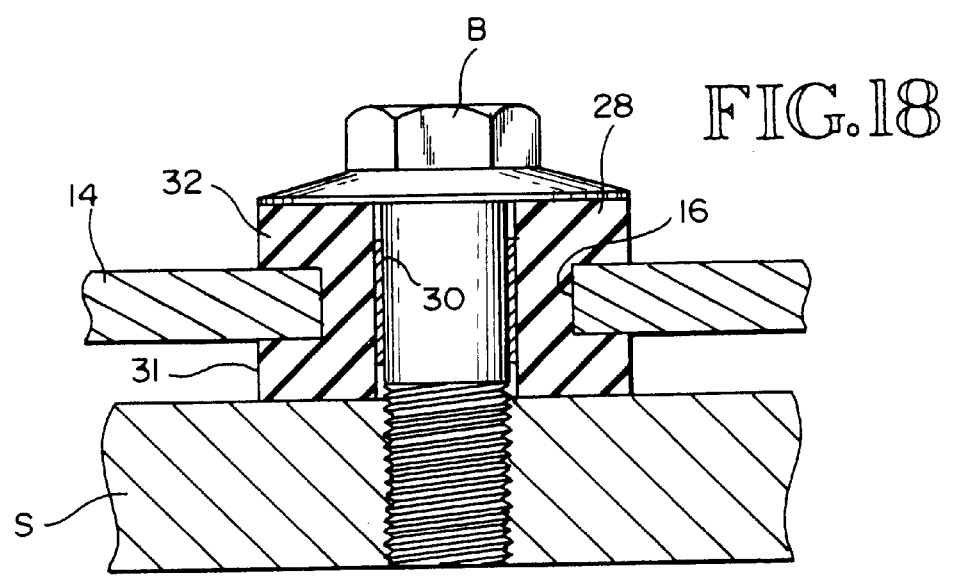
FIG. 18 is a sectional view showing the connection between the base of the bracket to a support structure.

FIG. 18 illustrates the attachment of the base 14 to a support structure S. An isolator bushing 28, 30 is positioned in one of the fastener slots 16 at the point of attachment. The bushing comprises a main body portion 28 made of an elastomeric material, such as natural rubber. The main body 28 is generally cylindrical with opposite annular flanges 31, 32 that engage the support structure S and the head of a fastener B, respectively. The body 28 defines an axial opening that extends through the bushing 28, 30 and receives a shaft portion of a fastener, such as the bolt B shown in FIG. 18. The material of the body 28 is sufficiently compressible to isolate the terminal 2, 4 from damaging vibrations and lateral dynamic loads. In its preferred form, the bushing includes a metal sleeve 30 that lines an axially center portion of the axial opening in the body 28. The sleeve 30 stabilizes and strengthens the bushing 28, 30 when it is compressed between the bolt head and the support structure S. The opposite ends of the metal sleeve 30 are spaced axially inwardly from the opposite ends of the axial opening.

The arms 20 of the bracket 12 are attached to the terminal 2, 4 to mount the terminal 2, 4 on a support structure to which the base 14 has been secured. For the purpose of making the connection between the arms 20 and the terminal 2, 4, the terminal 2, 4 preferably is provided with a mounting lug 34 on each of its opposite sides. The lugs 34 can be seen in FIGS. 3 and 8. Referring to FIG. 8, each lug 34 has first and second threaded openings 36, 38. The first opening 36 is located on the pivot axis. When the terminal 2, 4 is mounted on the bracket 12, the terminal 2, 4 is placed between the arms 20 and the threaded openings 36, 38 are aligned with the openings 24, 26 in the arms 20.

As mentioned above, it is anticipated that the main use of the bracket of the invention will be for mounting a terminal of the type shown in FIGS. 1–7, 9–11, 16, and 17. In this type of terminal, there is a keyboard portion 4 pivotably connected to a display portion 2. The pivot connection is accomplished by a hinge 6 having hinge knuckles 7 and conventional leaf portions (not shown) that are attached to the display portion 2 and the keyboard portion 4 by screws. The screw connection makes the pivotable attachment releasable. The hinge knuckles 7 are visible in FIGS. 1, 2, 5, 7, 10, and 11. When the keyboard portion 4 is detached from the display portion 2, communication between the two portions 2, 4 can be maintained by a cable, a radio frequency connection, or an infrared connection. For a cableless connection, the latter is preferred because of its lower cost. The separated keyboard portion 4 may be mounted on a different structure, such as a keyboard tray, by means of screws that engage the bottom of the keyboard portion 4.

A preferred feature of the bracket of the invention is a second pair of bracket arms for securing the keyboard portion 4 in a desired pivot position relative to the display portion 2. In the preferred embodiment, the bracket includes a pair of L-shaped keyboard sub-brackets 40. The structure of the sub-brackets 40 can best be seen in FIGS. 12 and 13. Each bracket 40 has an attachment leg 42 that is secured to the bottom of the display portion 2 of the terminal 2, 4, such as by a pair of screws. This attachment is illustrated in FIGS. 1, 2, 4, 7, and 9–11. The attachment leg 42 is provided with two fastener holes 44, shown in FIGS. 12 and 14, for receiving the screw fasteners. Each keyboard bracket 40 also includes a mounting leg 46 perpendicular to the attachment leg 42. An arcuate opening 48 extends through the mounting leg 46.

The mounting bracket of the invention also includes first and second fasteners for accomplishing the attachment of a component, such as the terminal 2, 4, to a support structure. The first fastener is aligned along the pivot axis and engages the component to removably and pivotably but nontranslatably connect the component to the bracket 12. Preferably, the first fastener 49 is a shoulder screw that threadedly engages the first opening 36 in the mounting lug 34 and pivotably engages the round opening 24 in the corresponding bracket arm 20.

The second fastener has a shaft portion that extends through the arcuate opening 26 of the arm 20 and engages the component. The second fastener is releasably tightenable to secure the shaft portion in a desired position along the arc formed by the arcuate opening 26 and the component in a desired pivotal orientation relative to the bracket 12. The capability of the second fastener to be released also allows loosening of the second fastener and movement of the shaft portion along the arcuate opening 26 to adjust the relative orientation to a new desired orientation and improve the readability of the component to a user of the component. Preferably, the second fastener comprises a bolt 50 having a head portion 52 and a threaded shaft 54. The head portion 52 includes an outer knob and an integral washer 53. It is tightenable against the corresponding arm 20 of the bracket 12 to secure the component against movement relative to the bracket 12. The tightening and loosening of the bolt 50 is accomplished by grasping the knob of the head portion 50 and turning it to move the threads S of the shaft 54 relative to the threads in the lug opening 38 and thereby move the shaft 54 inwardly and outwardly in the lug opening 38. A friction pad (not shown) is positioned in a recess in the mounting lug 34 between the lug 34 and the bracket arm 20 to help secure the position of the terminal 2, 4 when the bolt 50 is tightened.

The mounting of the keyboard portion 4 to the display portion 2 is functionally substantially the same as the mounting of the display portion 2 to the bracket 12. The hinge 6 functions as the first fastener that is aligned along the pivot axis and pivotably connects the keyboard 4 to the display portion 2. The second fastener 56 is similar to the second fastener 50 that attaches the display portion 2 to the bracket 12, with the major difference being that the keyboard second fastener 56 is smaller. The keyboard fastener 56 has a head portion 58 and a threaded shaft portion 60 that is received through the arcuate opening 48 in the mounting leg 46 of the keyboard bracket 40. The shaft 60 extends through the opening 48 and into a threaded opening in the side of the keyboard portion 4. The fastener 56 is turned to tighten and loosen it to secure the keyboard in a desired pivot position and to release the keyboard therefrom.

Figure 15:
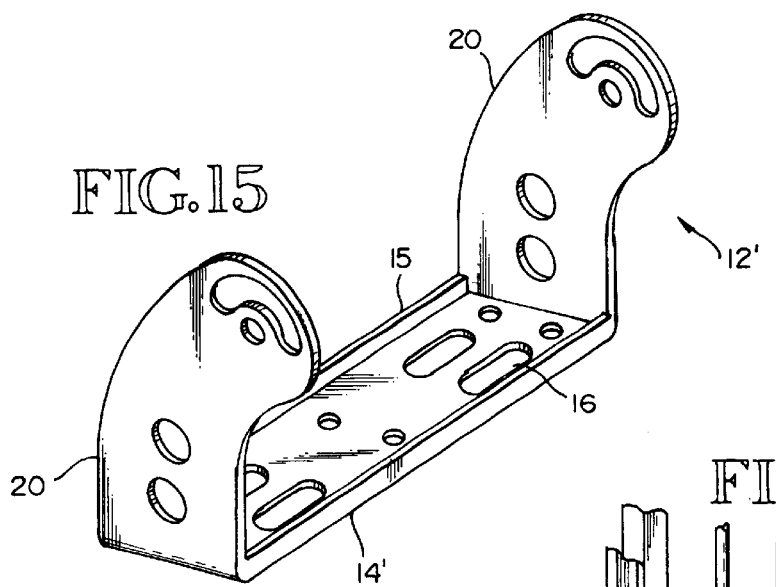
FIG. 15 is a pictorial view of a modified form of the bracket.

FIG. 15 illustrates a slightly modified form of the bracket 12'. This modified bracket 12' is the same as the bracket 12 shown in FIGS. 12–14 except for the details of the structure of the base 14'. The base 14' shown in FIG. 15 does not have the gussets 18 shown in FIGS. 12 and 14. Instead, the flat plate of the base 14' has a perpendicular lip 15 extending along each of its opposite edges between the two arms 20. This lip 15 serves to reinforce the bracket 12. Currently, the structure of the base 14 shown in FIG. 12 is preferred over that of the base 14' shown in FIG. 15. Experiments in which the brackets 12, 12' were subjected to severe shocks and vibrations have shown that the gusset structure is stronger.

Figure 11:
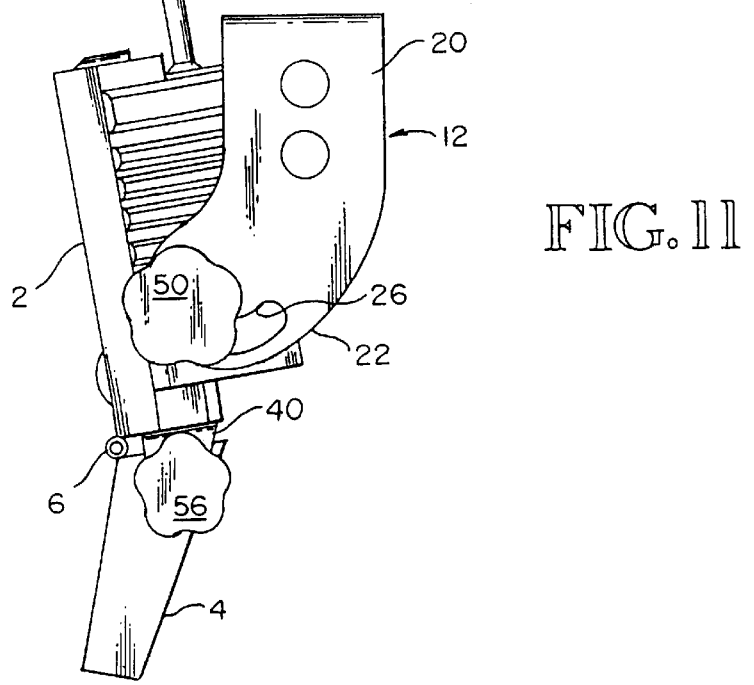
FIG. 11 is a side elevational view of the bracket and terminal shown in FIG. 10.

FIGS. 16 and 17 illustrate two typical mounting arrangements of the terminal 2, 4 using the preferred embodiment of the mounting bracket 12. FIG. 16 shows a forklift cab F having a guard rail G. The bracket 12 is secured to the guard rail G and is oriented relative to the terminal 2, 4 as shown in FIGS. 10 and 11 to provide an overhead mount of the terminal 2, 4. FIG. 17 shows a different forklift cab in which there is room to mount a computer terminal on the dash D. The terminal 2, 4 is mounted on the dash D with the bracket 12 in the relative orientation shown in FIGS. 1–7 and 9. These are two typical mount positions but are only two examples of the various ways in which a terminal may be mounted on a vehicle by use of the bracket of the invention. An additional example is mounting the terminal on a vertical wall or a post with the bracket 12 connected to the terminal as shown in FIGS. 1 and 17 but with the terminal pivoted into a different relative orientation.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. A mounting bracket for mounting a computer terminal on a vehicle, said bracket comprising:

a base attachable to a support structure of a vehicle; and a pair of arms projecting from opposite end portions of said base; said arms being spaced apart a distance sufficient to receive a computer terminal therebetween; and each said arm having a round opening, said openings in said arms being aligned and together defining a pivot axis, and an arcuate opening defining a circular arc concentric with said round opening, said arcuate openings being aligned;

for each said arm, a first fastener extending through said round opening and removably engageable with the terminal to removably and pivotably connect the terminal to the bracket, and a second fastener having a shaft that extends through said arcuate opening and is engageable with the terminal, said second fastener being tightenable to secure said shaft in a desired position along said arc to secure the terminal in a desired orientation relative to the bracket and loosenable to allow adjustment of said orientation and readability of the terminal to an operator of the vehicle; and a second pair of arms for securing a keyboard portion of the terminal in a pivot position relative to a display portion of the terminal, said arms of said second pair being fixedly securable to one of said portions of the terminal, and each said arm of said second pair having an arcuate opening configured to receive a releasably tightenable fastener for releasably securing said keyboard portion against pivoting relative to said display portion about a hinge axis.

2. The bracket of claim 1, wherein each said first fastener comprises a shoulder screw that is threadedly engageable with the terminal and pivotably engages the corresponding arm projecting from the base of the bracket, and each said second fastener comprises a bolt having a head portion tightenable against the corresponding arm projecting from the base of the bracket to secure the terminal against movement relative to the bracket.

3. The bracket of claim 1, wherein said base comprises a substantially flat plate from which said arms projecting from the base extend substantially perpendicularly, and the bracket includes a plurality of gussets positioned at junctures between said plate and said arms.

4. The bracket of claim 3, in which said plate has at least one mounting hole extending therethrough, and which comprises an isolator bushing positioned in said hole and having opposite flanges for engaging the support structure and a head portion of a bolt fastener extended through said bushing to attach said base to the support structure, said bushing being sufficiently compressible to isolate the terminal from vibrations and lateral dynamic loads.

5. The bracket of claim 1, in which said base has at least one mounting hole extending therethrough, and which comprises an isolator bushing positioned in said hole and having opposite flanges for engaging the support structure and a head portion of a bolt fastener extended through said bushing to attach said base to the support structure, said bushing being sufficiently compressible to isolate the terminal from vibrations and lateral dynamic loads.

6. The bracket of claim 5, wherein said bushing has a main body portion made of an elastomeric material and defining an axial opening for receiving a shaft portion of the bolt fastener therethrough, and a metal sleeve lining an axially center portion of said axial opening; said axial opening having opposite ends, and said metal sleeve lining having opposite ends spaced axially inwardly from said ends of said axial opening.

7. The bracket of claim 1, wherein said arms projecting from the base are substantially flat and substantially parallel, extend substantially perpendicularly from said base, and have outer end portions that curve to be offset from said base to facilitate connection of each of said arms to either of two opposite sides of the terminal and adjustment of the orientation of the terminal relative to the bracket over a wide range of orientations.

8. The bracket of claim 7, wherein said arc extends along about 125°.

* * * * *

UNITED STATES PATENT AND TRADEMARK OFFICE
CERTIFICATE OF CORRECTION

PATENT NO: 6,113,047

DATED: September 5, 2000

INVENTOR(S): Peter Wung and Bahram Sharifi

It is certified that error appears in the above-identified patent and that said Letters Patent are hereby corrected as shown below:

Column 2, line 34, "1250" should be -- 125° --.

Column 4, line 56, "s" should be -- shown --.

Signed and Sealed this

First Day of May, 2001

Attest:

NICHOLAS P. GODICI

Attesting Officer     Acting Director of the United States Patent and Trademark Office